United States Patent [19]

Koshugi

[11] 4,301,067

[45] Nov. 17, 1981

[54] CHITIN CONTAINING POLY-ION COMPLEX

[75] Inventor: Junichi Koshugi, Tokyo, Japan

[73] Assignee: Kureha Kagaku Kogyo Kabushiki Kaisha, Tokyo, Japan

[21] Appl. No.: 153,906

[22] Filed: May 28, 1980

[30] Foreign Application Priority Data

Jun. 5, 1979 [JP] Japan .................................. 54/70463
Jun. 5, 1979 [JP] Japan .................................. 54/70464
Jun. 5, 1979 [JP] Japan .................................. 54/70465
Jun. 5, 1979 [JP] Japan .................................. 54/70466

[51] Int. Cl.$^3$ ..................... C07C 103/52; C08B 37/08; C08B 37/10
[52] U.S. Cl. ............... 260/112.5 R; 536/20; 536/21; 536/51; 536/53; 536/54; 536/55; 264/186; 424/177; 424/180
[58] Field of Search ............................ 536/20, 21, 18; 424/180; 260/112.5 R

[56] References Cited

U.S. PATENT DOCUMENTS 3,689,466  9/1972  Bridgeford et al. .................. 536/20
4,063,016 12/1977  Austin .................................. 536/20
4,125,708 11/1978  Masri et al. .......................... 536/20

OTHER PUBLICATIONS

*Chemical Abstracts,* vol. 88, 1978, 184937g.
*Patent Abstracts of Japan,* vol. 3, No. 55, May 11, 1979, pp. 141C45.
H. Fukuda, "Polyelectrolyte Complexes of Sodium Carboxymethyl cellulose with Chitosan," *Die Makromoekular Chemie,* vol. 180, No. 6, pp. 1631–1633, Jun. 1, 1979.
Y. Kikuchi, "Polyelectrolyte Complex of Heparin with Chitosan," *Die Makromolekular Chemie,* vol. 175, pp. 2209–2211, 1974.
Y. Kikuchi, "Polyelectrolyte Complex of Sodium Dextran Sulfate with Chitosan," *Die Makromolekular Chemie,* vol. 175, No. 12, pp. 3593–3596, Dec. 1974.

*Primary Examiner*—Johnnie R. Brown
*Attorney, Agent, or Firm*—Wegner & Bretschneider

[57] ABSTRACT

This invention relates to a poly-ion complex comprising chitin or N-acylchitosan derivative having carboxymethyl and polyelectrolyte.

7 Claims, No Drawings

CHITIN CONTAINING POLY-ION COMPLEX

BACKGROUND AND DETAILED DESCRIPTION OF THE INVENTION

The present invention relates to poly-ion complex comprising chitin or N-acylchitosan derivative having carboxylic acid group and polyelectrolyte (hereinafter abbreviated as PC). More in detail, the present invention relates to poly-ion complex obtained by subjecting carboxymethyl N-acylchitosan or de-N-acylated carboxymethyl N-acylchitosan, which is soluble in an aqueous solvent and is an anionic or amphoteric high polymeric electrolyte or its salt to a reaction with anionic or cationic polymer in an aqueous solvent, and a process for preparing the poly-ion complex, and further relates to poly-ion complex obtained by subjecting carboxymethylchitin or deacetylated carboxymethylchitin, which is soluble in an aqueous solvent and is an anionic or amphoteric high polymeric electrolyte or its salt to a reaction with anionic or cationic polymer in an aqueous solvent; and a process for preparing the poly-ion complex.

The PC is a complex compound obtained by subjecting a positive-charged polyelectrolyte to a reaction with a negative-charged polyelectrolyte in a solvent; obtained by subjecting a positive-charged polyelectrolyte to a reaction with an amphoteric polyelectrolyte; or obtained by subjecting a negative-charged polyelectrolyte to a reaction with an amphoteric polyelectrolyte.

The reaction is very interesting as a model of reactions in living bodies such as those represented by a mutual reaction between a polysaccharide and a protein. Recently, the materials obtained by utilizing the above-mentioned reaction for forming PC are attracting the attention as a functional material for medical treatments or for living bodies, for instance, a dialysis membrane and filter material for use in ultrafiltration.

In cases where the PC-material is used as a material for living body, it is indispensable that the component of PC or PC itself is compatible with, non-toxic to and stable within or without the living body.

In these points, chitin or N-acylchitosan is chemically stable also within the living body and safe to the living body, however, since chitin is highly crystalline in nature and its bonding with aminoacetyl group is strong, no solvent is available for dissolving, dispersing or swelling chitin so favorably as is in the case of cellulose.

For instance, dichloroacetic acid, sulfuric acid and formic acid are mentioned as a solvent for chitin or N-acylchitosan. However, these solvents cause the reduction of molecular weight or the degradation of chitin or N-acylchitosan, and have several problems of handling such as treatment of waste liquor. Accordingly, in order to convert chitin into a soluble derivative in safer solvents, several trials have been carried out such as alkylation or acetylation of chitin.

For instance, the deacetylated chitin, i.e., chitosan and its derivatives have been proposed.

As a PC using chitin as its starting material, the PC of chitosan and a sulfonated polyvinyl alcohol (Japanese Patent Application Laid Open No. 8879/75) and the PC of chitosan and sulfonated cellulose (Japanese Patent Application Laid Open No. 123,179/75) have been proposed.

The inventors of the present invention have found in the studies for utilizing and developing chitin or N-acyl chitosan derivative which is the carboxymethylchitin, the deacetylated carboxymethylchitin, the carboxymethyl N-acylchitosan, the de-N-acylated carboxymethyl N-acylchitosan or its salt. The carboxymethylchitin, the carboxymethyl N-acylchitosan or its salt is soluble in an aqueous alkaline solution. The deacetylated carboxymethylchitan, the de-N-acylated carboxymethyl N-acylchitosan or its salt is soluble in an aqueous acidic or alkaline solution and also in an aqueous solution of a neutral salt at a moderately high concentration. Moreover, the above-mentioned deacetylated derivative is an amphoteric polyelectrolyte having carboxyl and amino groups. It is an object of the present invention to provide a poly-ion complex comprising: chitin or N-acylchitosan derivative having carboxymethyl; and a polyelectrolyte. The chitin derivative is carboxymethylchitin, an amphoteric deacetylated carboxymethylchitin or its salt. The N-acylchitosan derivative is carboxymethyl N-acylchitosan, de-N-acylated carboxymethyl N-acylchitosan or its salt. The PC according to the present invention is extremely well soluble in aqueous solvents, and has favorably high processability.

For instance, carboxymethylchitin and the deacetylated derivative of carboxymethylchitin for use in the present invention are obtainable, for instance, by the following procedures:

Chitin represented by the following general formula (I) obtained by separation from crusts of crustaceans such as crabs and lobsters and purification in a conventional method is brought into reaction with monochloroacetic acid to be carboxymethylated to carboxymethylchitin or its salt represented by the general formula (II):

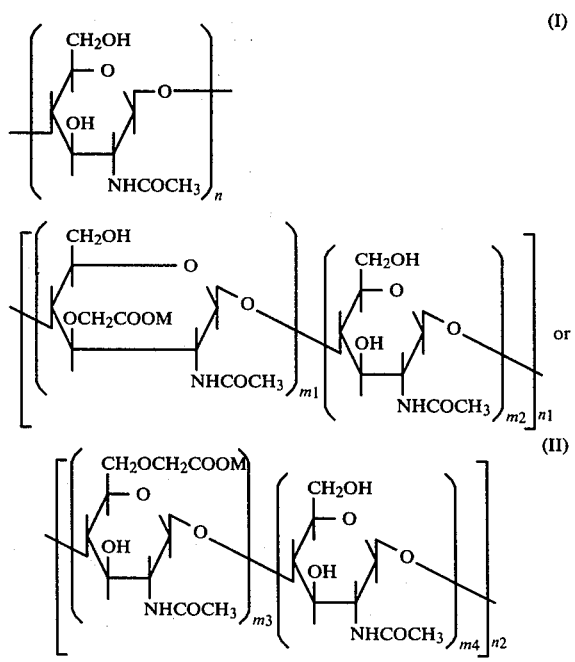

wherein M represents a hydrogen atom, alkali metal, alkaline earth metal or an ammonium group; $m_1$, $m_3$, n, $n_1$ and $n_2$ represent any positive integer; $m_2$ and $m_4$ represent zero or any positive integer.

In carboxymethyl N-acylchitosan or its salt of the present invention, the carboxymethylation degree per pyranose unit, which is a structural unit, is 0.1 to 1.0, preferably 0.3 to 1.0.

In the next place, the above-mentioned carboxymethyl N-acetylchitosan or its salt is heated in an aqueous alkaline solution, for instance, sodium hydroxide or potassium hydroxide to cause deacylation to obtain the amphoteric polyelectrolyte in an aqueous solvent, i.e., the de-N-acylated carboxymethyl N-acylchitosan or its salt for use in the present invention. The de-N-acylation degree of the deacylated substance is 0.1 to 1.0, preferably 0.3 to 1.0 per pyranose unit.

In carboxymethylchitin or its salt of the present invention, the carboxymethylation degree per pyranose unit, which is a structural unit, is 0.1 to 1.0, preferably 0.3 to 1.0.

In the next place, the above-mentioned carboxymethylchitin or its salt is heated in an aqueous alkaline solution, for instance, sodium hydroxide or potassium hydroxide to cause deacetylation to obtain the amphoteric polyelectrolyte in an aqueous solvent, i.e., the deacetylated carboxymethylchitin or its salt for use in the present invention. The deacetylation degree of the deacetylated substance is 0.1 to 1.0, preferably 0.3 to 1.0 per pyranose unit. (The example of producing the deacetylated product of carboxymethylchitin is described in Japanese Patent Application No. 161,391).

The typical composition units of carboxymethylchitin, deacetylated carboxymethylchitin, carboxymethyl N-acylchitosan and de-N-acylated carboxymethyl N-acylchitosan of the present invention are exemplified as follows by using simplified structural formulae:

(A) anionic unit of construction:

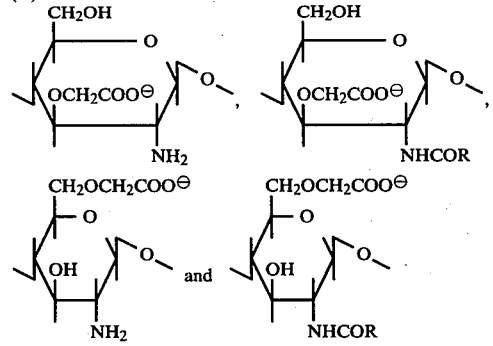

(B) cationic unit of construction:

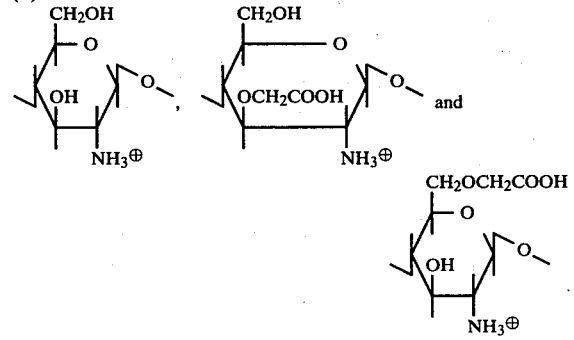

(C) neutral unit of construction:

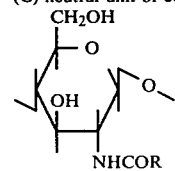

wherein R represents alkyl having 1 to 12 carbon atoms.

It is difficult to indicate the structure of PC of the present invention clearly by a chemical formula, however, it is presumed that the PC has a net-work of three dimensional structure comprising mainly electrostatic bonding between $-NH_3^{\oplus}$ of the de-N-acylated carboxymethyl N-acylchitosan and an anionic group of a polyelectrolyte or between $-COO^{\ominus}$ of the de-N-acylated carboxymethyl N-acylchitosan and a cationic group of a polyelectrolyte.

The polyelectrolytes for use in the present invention are divided into the following four groups:

(1) A group of aqueous solution-soluble chitosan derivatives, for instance, chitosan, glycol-chitosan, glycelide-chitosan, N-methylglycol-chitosan, etc., those having amino group(s), (2) A group of sulfated chitin derivatives or chitosan derivatives, both being aqueous solution-soluble, for instance, anionic ones such as O-sulfated chitin, N-sulfated chitosan or N-sulfated, glycol-chitosan, or O- and N-sulfated chitosan and glycol-chitosan, for instance, chitosan sulfuric acid ester, chitin sulfuric acid ester and glycol-chitosan sulfuric acid ester.

(3) A group consisting of dextran sulfate, hepalin and chondroitin sulfuric acid (chondroitin sulfate).

(4) A group of anionic- or cationic aqueous solution-soluble polymers. As an anionic polymer, for instance, polystyrenesulfonate, polyethylenesulfonate, partially sulfated polyvinyl alcohol, polyacrylate, polymethacrylate and poly-L-glutamate are used; and as a cationic polymer, for instance, poly-L-lysine, polyethyleneimine, polyvinylpyridine, polyvinylbenzyltrimethylammonium salt and polydiallyldimethylammonium salt are used.

The inonic polyelectrolytes used in the present invention are soluble in an aqueous solvent and accordingly, the PC of the present invention is easily produced without using any organic solvent. That is, the PC according to the present invention may be obtained by dissolving the carboxymethyl N-acylchitosan, the de-N-acylated carboxymethyl N-acylchitosan or its salt in an aqueous solvent and adding to the solution a solution of cationic- or anionic polyelectrolyte under stirring and then separating and washing the thus formed PC with water.

The aqueous solvent for use in the above-mentioned reaction is an aqueous acidic- or alkaline solution. The concentration of the solute (acid or alkali) can be selected freely, however, in consideration of the viscosity of the solution, usually is 0.1 to 5% by weight. Care should be taken, because of the formation of non-uniform PC or of gel-like PC, not to make the viscosity too high. The reaction temperature for the PC is preferably below 100° C., because the solvent is aqueous, and more preferably at the vicinity of room temperature.

The confirmation of the formation of PC is possibly carried out by elementary analysis, infrared spectroscopy and solubility test. The limiting viscosity ($\eta_{sp}/c$) at a temperature of 20° C. (determined by the Ubbelohde viscometer) of the PC of the present invention is 0.1 to 20.

The PC obtained according to the present invention is soluble in an aqueous solution of pH at which the partner of the carboxymethyl N-acylchitosan, the de-N-acylated carboxymethyl N-acylchitosan or its salt is soluble and also is soluble in an aqueous solution of a neutral salt. In this point, the PC of the present invention is extremely high in processability.

For instance, it is soluble into the aqueous solution of sodium chloride, potassium chloride, calcium chloride, magnesium chloride, ammonium chloride, etc. or sodium, potassium, magnesium or ammonium salt of an organic acid such as acetic-, adipic-, propionic-, mandelic-, salicylic- and succinic acid.

Accordingly, after dissolving the PC of the present invention into one of the above-mentioned solution and shaping it into film-like of fiber-like bodies, insolbilization is easily carried out by desalting treatment.

The electrodeposition method of G.B. Pat. No. 1,153,551 may be used for preparation of the shaped material from the above-mentioned solution. In this case, deacetylated carboxymethylchitin or de-N-acylated carboxymethyl N-acylchitosan is very utilizable owing to an amphoteric polyelectrolyte. In either condition of acidic or basic aqueous solution, the shaped material is obtained by electrophoresis and then electrodeposit of the amphoteric polyelectrolyte with other constituent of anionic or cationic polyelectrolyte.

This insolubilization is made further complete by thermal treatment, treatment by ultraviolet rays and treatment by a cross-linking agent.

The shaped bodies of the PC of the present invention is excellent in chemical proofness and thermal resistance and based on a chitin or N-acylchitosan derivative, and so it is stable within the living bodies. And because of having ionic groups, it is utilizable as a material for microcapsule, for edible casing or for membrane for use in dialysis and ultrafiltration in artificial organs and for surgical operation, for membrane as a separator in accumulator, for membrane of fuel cells, a material of plastics regulating humidity and a coating material for electroconductivity or for preventing electric charging.

The followings are the exemplification of the present invention by Examples:

EXAMPLE 1

A solution named as A-liquid was prepared by dissolving 16 g of a commercial chitosan into 2 liters of an aqueous 1% by weight acetic acid solution. Another solution named as B-liquid was prepared by dissolving 28 g of sodium salt of deacetylated carboxymethylchitin (degree of carboxymethylation of 1.0, degree of deacetylation of 0.3 and limiting viscosity of 9.5) in 2 liters of water. Into 2 liters of B-liquid, 400 ml of A-liquid was added while stirring. Then, a white cloudy substance appeared in the mixture, and it became a precipitate. After stirring the mixture for one more hour, the precipitate was separated by centrifugation to obtain a white precipitate (I).

To the resulted clear filtrate, 400 ml of A-liquid was added under agitation to form another white precipitate. After leaving the mixture for one hour, the precipitate was separated by centrifugation to obtain another white precipitate (II). The same procedures were repeated to obtain a series of white precipitates of (III), (IV) and (V). Each precipitate was washed with water then with ethanol and dried. The weights and the results of elementary analyses of those precipitates (I) to (V) are shown in Table 1.

TABLE 1

| Specimen | Weight (g) | Analytical composition (%) | | | |
|---|---|---|---|---|---|
| | | C | H | O | N |
| Precipitate (I) | 7.5 | 45.2 | 6.2 | 41.8 | 6.8 |
| Precipitate (II) | 7.6 | 45.0 | 6.3 | 41.8 | 6.9 |
| Precipitate (III) | 7.7 | 45.1 | 6.5 | 41.1 | 7.0 |
| Precipitate (IV) | 8.0 | 45.3 | 6.5 | 41.1 | 7.1 |
| Precipitate (V) | 8.1 | 45.1 | 6.5 | 41.2 | 7.2 |
| Deacetylated carboxymethylchitin (starting material) | | 45.0 | 6.0 | 43.5 | 5.5 |
| Chitosan (starting material) | | 45.0 | 6.8 | 39.5 | 8.7 |

The above-mentioned Table 1 also shows the elementary analytical data of deacetylated carboxymethylchitin and chitosan used in Example 1.

As is seen in Table 1, the elementary analytical data of the precipitate shows a favorably good coincidence with the data on the calculated data of a 1:1 mixture of deacetylated carboxymethylchitin and chitosan of C: 45.0, H: 6.4, O: 41.5 and N: 7.1 from the elementary analytical data of the two compounds.

The precipitates (I) to (V) are favorably soluble into an aqueous 7% by weight sodium acetate solution, and showed an infrared absorption band in the vicinity of 1510 cm$^{-1}$ attributable to —NH$_3^{\oplus}$ and an infrared absorption band in the vicinity of 1710 cm$^{-1}$ attributable to —COO$^{\ominus}$. From these informations, it is confirmed that the precipitate is the PC with cross-linked net-work structure by ion bonding. Total yield of the precipitate was 38.9 g, 95% of theoretical.

EXAMPLE 2

A solution of 5 g of the PC obtained in Example 1 dissolved in 200 ml of an aqueous 7% by weight sodium acetate was poured onto a glass plate and after evaporating water in an amount of 100 ml at a temperature of 40° C., the plate with the concentrated solution was immersed into a 4:1 mixture of ethanol and water to remove sodium acetate and after removing the solvent at a temperature of 70° C., a clear film was obtained.

The strength of the thus obtained film was determined after controlling the moisture content for 2 days at a temperature of 30° C. and relative humidity of 60%. The results are as follows:

Tensile strength: 300 kg/cm$^2$ at elongation of 12%
Young's modulus: 28,000 kg/cm$^2$
The limiting viscosity of the product in an aqueous 0.1 N sodium acetate solution at 20° C. is 10.8.

EXAMPLE 3

A solution prepared by dissolving 16 g of commercial chitosan into 2 liters of an aqueous 1% by weight acetic acid was named as A-liquid. Another solution prepared by dissolving 29 g of sodium salt of carboxymethylchitin having degree of carboxymethylation of 1.0 and limiting viscosity of 11.0 into 2 liters of water was named as B-liquid. Upon addition of A-liquid into B-liquid under agitation, the mixture became turbid and a precipitate appeared. After separating the precipitate by filtration and washing with water and then with ethanol, the washed precipitate was dried to give 42 g of white powder at a yield of about 100%. The elementary analysis of the powder gave a nitrogen content of 6.7%.

Infrared absorption spectroscopy of the thus obtained produce revealed two absorption bands respectively at 1710 cm$^{-1}$ and 1500 cm$^{-1}$, the former being attributed to carbonyl group and the latter being attributed to —NH$_3^{\oplus}$. From these findings, the formation of PC was confirmed.

EXAMPLE 4

To a solution prepared by dissolving 27 g of sodium salt of carboxymethyl chitin having a degree of carboxylation of 0.8 and a limiting viscosity of 11.5 into 2 liters of water, a solution prepared by dissolving 20 g of glycol-chitosan into one liter of an aqueous 1% acetic acid solution was added while stirring. The mixture became turbid and a white precipitate appeared. By the same procedures as in Example 3, white powder was obtained in an amount of 44 g at a yield of about 100%. The elementary analysis of the thus obtained powder gave a nitrogen content of 6.2%. Infrared absorption spectroscopy of the powder revealed two absorption bands, respectively in the vicinity of 1710 and 1500 $cm^{-1}$, the former being attributed to carbonyl group and the latter being attributed to $-NH_3^{\oplus}$. From these findings, it was confirmed that the powdery product was a PC comprising glycolchitosan and carboxymethylchitin at a ratio of 1:1.

EXAMPLE 5

A solution prepared by dissolving 37 g of N-methyl-glycol-chitosan iodide salt into one liter of an aqueous 1% acetic acid was added to a solution prepared by dissolving 29 g of sodium salt of carboxymethylchitin of a degree of carboxymethylation of 1.0 and of a limiting viscosity of 11.0 into 2 liters of water under agitation. The mixture became turbid and a white precipitate appeared. By the same procedures as in Example 3, a white powder was obtained in an amount of 45 g at a yield of about 100%. Elementary analysis of the thus obtained powder gave a nitrogen content of 5.5%. From the results of infrared absorption spectroscopy of the powder, it was confirmed that the product was a PC of a composition of 1:1 of N-methylglycol-chitosan and carboxymethylchitin.

EXAMPLE 6

A solution prepared by dissolving 10 g of the PC obtained in Example 3 into 200 ml of an aqueous 8% ammonium acetate was casted on a glass plate, and dried at a temperature of 40° C. The dried matter was washed with water and again dried to be a transparent film. The mechanical properties of the thus obtained film are shown in the table below. The pliability of the film depends on relative humidity, and when the relative humidity is higher, the film becomes softer and gives larger elongation.

TABLE

| Tensile strength | dry | 420 kg/cm² |
|---|---|---|
|  | wet | 50 kg/cm² |
| Elongation | dry | 2.0% |
|  | wet | 25% |

The limiting viscosity of the product was 14.5 at 20° C. in an aqueous 0.1 N ammonium acetate solution.

EXAMPLE 7

A solution prepared by dissolving 10 g of the PC obtained in Example 4 into 250 ml of an aqueous 10% ammonia solution was casted on a glass plate and was dried at a temperature of 40° C. to be a transparent film. Some of the mechanical properties of the thus prepared film are shown in the following table:

TABLE

| Tensile strength | dry | 350 kg/cm² |
|---|---|---|
|  | wet | 30 kg/cm² |
| Elongation | dry | 2.5% |
|  | wet | 30% |

The limiting viscosity of the product was 12.7 at 20° C. in an aqueous 0.1 N sodium hydroxide solution.

EXAMPLE 8

A solution prepared by dissolving 36.5 g of sodium salt of N—, O—, sulfated chitosan (of a limiting viscosity of 1.2) into 2 liters of water is named as A-liquid. This solution is added into another solution prepared by dissolving 21.5 g of carboxymethyl chitosan hydrochloride of a degree of carboxymethylation of 0.3, of a degree of de-acetylation of 1.0 and of a limiting viscosity of 8.0 and showing a blue colour by the addition of toluidine blue indicator, under agitation. The colour of the mixture changed to purplish red and a precipitate appeared. After separating the precipitate by filtration, washing with water and drying the washed precipitate, 45.0 g of a white powder was obtained at a yield of 90.5%. The elementary analytical data of the thus obtained powder are shown in Table 2. As is seen in Table 2, the analytical data resembles to the values of elementary composition of a 1:2 mixture of N-, O-sulfated chitosan and carboxymethylchitosan.

TABLE 2

|  | Analytical composition (%) | | | | |
|---|---|---|---|---|---|
|  | C | H | N | O | S |
| Produced precipitate | 37.2 | 5.5 | 6.6 | 43.9 | 6.8 |
| Chitosan sulfate ester | 22.6 | 2.7 | 4.4 | 50.2 | 20.1 |
| Deacetylated carboxymethylchitin | 44.4 | 6.5 | 7.8 | 41.3 | 0 |

Since the product shows the two infrared absorption bands respectively at 1510 $cm^{-1}$, 1210 $cm^{-1}$ and 1040 $cm^{-1}$, the former being attributed to $-NH_3^{\oplus}$ and the latter being attributed to $-SO_3^{\ominus}$, in consideration of the above-mentioned elementary analytical data, it was confirmed that the precipitate forms a PC.

EXAMPLE 9

Five grams of the PC obtained in Example 8 was dissolved in 200 ml of an aqueous 5% ammonia solution, and the solution was casted on a glass plate. After removing ammonia and water at a temperature of 40° C. from the cast solution on the plate, a transparent film was obtained. The mechanical pliability properties of the film depend on its moisture content, it becoming soft and pliable when wet as is shown in Table 3.

TABLE 3

|  | dry | wet |
|---|---|---|
| Tensile strength | 250 kg/cm² | 50 kg/cm² |
| Elongation | 1.5% | 10% |

EXAMPLE 10

An aqueous solution was prepared by dissolving 38 g of commercial sodium dextran sulfate of molecular weight of 500,000 and of sulfur content of 18.8% into one liter of water, and this solution was slowly added under agitation into another solution prepared by dissolving 23 g of sodium salt of deacetylated carboxymethylchitin (a degree of carboxymethylation of 0.5 and a degree of de-acetylation of 1.0 with a limiting viscosity of 8.5) into 2 liters of water. The mixture became turbid and a white precipitate appeared. After separating the precipitate by filtration and washing with water and then with ethanol, the precipitate was dried to be 51 g of white solid, the yield being nearly 100%. In its infrared absorption spectrogram, a band at 1510 cm$^{-1}$ attributable to —NH$_3^\oplus$ and two bands, respectively at 1210 and 1040 cm$^{-1}$ attributable to —SO$_3^\ominus$ were observed, and its sulfur content was elementary analytically 12.0%. From these informations, it is recognized that the product is formed by 1:1 poly-ion-complexing. The limiting viscosity of the thus obtained substance was 14.5 in an aqueous 0.1 N sodium hydroxide solution at 20° C.

EXAMPLE 11

The same procedures were carried out as in Example 10 except for dissolving 46 g of sodium salt of de-acetylated carboxymethylchitin in 2 liters of water instead of 23 g of the salt. The yield was nearly 100% in an amount of 69 g. The same infrared absorption bands were observed, however, with larger absorption intensity. The elementary analytical value of sulfur of the product was 9.0%. From these data, a production of the PC with a composition of 1:2 of dextran to deacetylated product was recognized. The limiting viscosity of the produce was 13.2 at 20° C. in an aqueous 0.1 N sodium hydroxide solution.

EXAMPLE 12

An aqueous solution prepared by dissolving 15 g of sodium salt of delauroylated carboxymethyl N-lauroyl-chitosan of a degree of carboxymethylation of 0.3, a degree of delauroylation of 0.8 and of a limiting viscosity of 8.5 into 500 ml of water was casted on a glass plate and dried at a temperature of 40° C. to be a film. On immersing the dried film into 200 ml of an aqueous solution of 1% sodium hepalin at 37° C., the surfaces of the film became turbid and the film was insolubilized. After washing the film with water and drying, a transparent film was obtained having the following properties:

| Tensile strength | dry | 220 kg/cm$^2$ |
|---|---|---|
|  | wet | 20 kg/cm$^2$ |
| Elongation | dry | 1.5% |
|  | wet | 13.0% |

EXAMPLE 13

Ten grams of the PC obtained in Example 10 was dissolved into 200 ml of an aqueous 5% ammonia solution, and the solution was casted on a glass plate. By removing ammonia and water from the solution on the glass plate at a temperature of 40° C., a transparent film was obtained.

EXAMPLE 14

An aqueous solution prepared by dissolving 9 g of sodium salt of depropionylated carboxymethyl N-propionylchitosan of a degree of carboxymethylation of 0.3 and a degree of depropionylation of 0.9 into 500 ml of water was brought into reaction with 100 ml of an aqueous 1% glutaraldehyde solution at a temperature of 5° C. for 10 min. The reaction mixture was then casted on a glass plate and dried at 40° C.

On immersing the thus obtained film into 100 ml of an aqueous 1% sodium hepalin at room temperature, the surfaces of the film became turbid with the formation of poly-ion complex. By washing the turbid and opaque film with water and drying at a temperature of 110° C. under atmospheric pressure for 2 hours, a transparent film was obtained.

EXAMPLE 15

An aqueous solution prepared by dissolving 10 g of poly sodium acrylate into 10 liters of water was admixed with another aqueous solution prepared by dissolving 25 g of de-acetylated carboxymethylchitin of a degree of carboxymethylation of 0.4, a degree of de-acetylation of 1.0 and a limiting viscosity of 7.9 into one liter of an aqueous 1% acetic acid solution under agitation. The mixture became turbid and a precipitate appeared. On separating the precipitate by filtration, washing with water and ethanol and then drying, 25 g of a white powdery product was obtained at a yield of about 90%. From the infrared absorption spectroscopic data showing the reduction of the intensities of the bands at 1190 and 1210 cm$^{-1}$ based on the stretching vibration of C—O of a carboxyl group, the relative increase of the intensity of the band at 1200 cm$^{-1}$ based on the stretching vabration of a dissociated carboxyl group and the presence of the bands at 1710 and 1510 cm$^{-1}$, respectively based on a carbonyl group and on a —NH$_3^\oplus$, the formation of a poly-ion complex was confirmed. The elementary analytical data of the product are shown in Table 4 as well as those of the raw materials.

TABLE 4

| Specimen | Analytical composition (found) (wt %) | | | |
|---|---|---|---|---|
|  | C | H | O | N |
| Product | 47.7 | 6.0 | 43.3 | 3.0 |
| Deacetylated carboxy-methylchitin | 44.0 | 6.5 | 42.0 | 7.5 |
| Poly(acrylic acid) | 50.0 | 5.6 | 44.0 | 0.0 |

The limiting viscosity of the product was 9.0 at 20° C. in an aqueous 0.1 N sodium hydroxide solution.

EXAMPLE 16

An aqueous solution prepared by dissolving 15 g of an aqueous 30% commercial polyethyleneimine of an average molecular weight of 4 to 5×10$^4$ into 500 ml of water was admixed with another aqueous solution prepared by dissolving 28 g of sodium salt of de-acetylated carboxymethylchitin of a degree of carboxymethylation of 1.0, a degree of de-acetylation of 0.3 and a limiting viscosity of 9.5 into one liter of water under agitation. The mixture became turbid and a precipitate appeared. By carrying out the same procedures as in Example 15 on the precipitate, 26 g of a white powdery substance was obtained at a yield of 85%.

The product gave an infrared absorption band at 1710 cm$^{-1}$ based on a carbonyl group, and together with the following data of elementary analysis, the formation of a poly-ion was confirmed:

TABLE 5

| Specimen | Results of Elementary Analyses | | | |
|---|---|---|---|---|
|  | Analytical Composition (%) | | | |
|  | C | H | O | N |
| Product | 49.5 | 8.1 | 25.9 | 16.4 |
| De-acetylated carboxy-methylchitin | 45.0 | 6.0 | 43.5 | 5.5 |

TABLE 5-continued

| | Results of Elementary Analyses | | | |
|---|---|---|---|---|
| | Analytical Composition (%) | | | |
| Specimen | C | H | O | N |
| Poly(ethyleneimine) | 55.4 | 11.1 | 0.0 | 33.5 |

The product showed a limiting viscosity of 9.9 at 20° C. in an aqueous 0.1 N sodium hydroxide solution.

EXAMPLE 17

By using sodium salts of polystyrenesulfonic acid (molecular weight of $5\times10^5$), of polymethacrylic acid (molecular weight of $2\times10^5$), of polyethylenesulfonic acid (molecular weight of $4\times10^5$), of poly-L-glutamic acid (molecular weight of B $1\times10^5$) and of sulfated polyvinyl alcohol (moleclar weight of $3\times10^5$), respectively for sodium salt of polyacrylic acid in Example 15, the same procedures as in Example 15 were carried out to produce the respective PCs shown in Table 6. The elementary analytical data of the products are also shown in Table 6.

All the products gave respective infrared absorption band at 1510 cm$^{-1}$ based on $-NH_3^\oplus$, and the products from polystyrenesulfonic acid, polyethylenesulfonic acid, sulfated polyvinyl alcohol gave two infrared absorption bands at 1210 and 1040 cm$^{-1}$ based on $-SO_3^\ominus$ and furthermore, the products from poly-L-glutamic acid and polymethacrylic acid gave an infrared absorption band at 1710 cm$^{-1}$ based on carbonyl group. These data confirmed the formation of respective poly-ions.

Further, each 5 g of the thus produced PCs was dissolved into an aqueous 5% ammonia solution and the solution was casted on a glass plate and dried at 40° C. to obtain a film.

The pliability of each film depended on the ambient relative humidity, however, all of them could be used for practical purposes at the relative humidity of 40 to 70%.

EXAMPLE 18

By using respective hydrochlorides of poly-L-lysine, polyvinylpyridine, polyvinylbenzyltrimethylammonium and polydiallyldimethylammonium instead of water-soluble synthetic polymer of polyethyleneimine in Example 16, and following the procedures shown in Example 16, PCs were produced under the conditions shown in Table 7. All of the products showed an infrared absorption band at 1710 cm$^{-1}$ based on a carbonyl group, which fact supports the formation of PC. The results are summarized in Table 7.

TABLE 6

Syntheses of PC

Conditions in common:
Derivative of chitin: deacetylated carboxymethylchitin of a degree of carboxymethylation of 0.4 and a degree of deacetylation of 1.0
Concentration of the derivation of chitin: 20 g in one liter of an aqueous 1% acetic acid solution

| aqueous solution-soluble synthetic polymer (sodium salt) | Concentration of the polymer (g/10 l of water) | Yield of PC (g) | Elementary analytical data of PC | | | | |
|---|---|---|---|---|---|---|---|
| | | | C | H | O | N | S |
| Polystyrenesulfonic acid | 20 | 28 | 47.5 | 5.8 | 33.5 | 4.9 | 8.3 |
| Polyethylenesulfonic acid | 13 | 23.5 | 31.0 | 4.9 | 43.0 | 3.3 | 17.8 |
| Poly-L-glutamic acid | 16 | 25 | 45.6 | 5.8 | 39.1 | 9.5 | 0.0 |
| Polymethacrylic acid | 10 | 22 | 51.2 | 6.8 | 39.0 | 3.0 | 0.0 |
| Sulfated polyvinyl alcohol | 20 | 30 | 35.3 | 4.0 | 45.5 | 3.5 | 11.7 |

TABLE 7

Syntheses of PC

Conditions in common:
Derivative of chitin (sodium salt): deacetylated carboxymethylchitin of a degree of carboxymethylation of 1.0 and a degree of deacetylation of 0.3
Concentration of the derivative of chitin: 28 g in one liter of water

| aqueous solution-soluble synthetic polymer (hydrochloride) | Concentration of the polymer (g/5 l of water) | Yield of PC (g) | Elementary analytical data of PC | | | |
|---|---|---|---|---|---|---|
| | | | C | H | O | N |
| Poly-L-lysine | 17 | 25 | 51.0 | 7.2 | 28.0 | 13.8 |
| Polyvinylpyridine | 14 | 23 | 62.7 | 6.2 | 21.6 | 9.5 |
| Polyvinylbenzyltrimethylammonium | 20 | 29.5 | 63.5 | 9.4 | 20.1 | 7.0 |
| Polydiallyldimethylammonium | 15 | 26 | 64.3 | 10.2 | 16.6 | 8.9 |

What is claimed is:

1. A poly-ion complex, comprising: chitin or N-acylchitosan derivative having carboxymethyl; and a polyelectrolyte, the acyl group of said N-acylchitosan derivative having an alkyl group of 1 to 12 carbon atoms.

2. The poly-ion complex according to claim 1, wherein the N-acylchitosan derivative is selected from the group consisting of (a) carboxymethyl N-acylchitosan having the carboxymethylation degree of 0.3 to 1 per pyranose unit, and (b) de-N-acylated carboxymethyl N-acylchitosan having the carboxymethylation degree of 0.1 to 1 per pyranose unit and the de-N-acetylation degree of 0.1 to 1 per pyranose unit.

3. The poly-ion complex according to claim 1, wherein the chitin derivative is selected from the group consisting of (a) carboxymethylchitin having the carboxymethylation degree of 0.3 to 1 per pyranose unit, and (b) deacetylated carboxymethylchitin having the carboxymethylation degree of 0.1 to 1 per pyranose unit and the deacetylation degree of 0.1 to 1 per pyranose unit.

4. The poly-ion complex according to claim 1, wherein the polyelectrolyte is an aqueous solution-soluble chitosan derivative having cationic group selected from the group consisting of chitosan, glycol-chitosan, glycelide-chitosan and N-methylglycol-chitosan.

5. The poly-ion complex according to claim 1, wherein the polyelectrolyte is an aqueous solution-soluble sulfated compound selected from the group consisting of O-sulfated chitin, N-sulfated chitosan, N-sulfated glycol-chitosan, O- and N-sulfated chitosan, and O- and N-sulfated glycol-chitosan.

6. The poly-ion complex according to claim 1, wherein the polyelectrolyte is a sulfate compound selected from the group consisting of dextran sulfate, chondrotin sulfate and heparin.

7. The poly-ion complex according to claim 1, wherein the polyelectrolyte is an aqueous solution-soluble synthetic compound selected from the group consisting of polystyrenesulfonate, polyethylenesulfonate, partially sulfated polyvinyl alcohol, polyacrylate, polymethacrylate, poly-L-glutamate, poly-L-lysine, polyethyleneimine, polyvinylpyridine, polyvinylbenzyltrimethylammonium salt and polydiallyldimethylammonium salt.

* * * * *